US012490885B2

(12) United States Patent
Yamaya

(10) Patent No.: US 12,490,885 B2
(45) Date of Patent: Dec. 9, 2025

(54) ENDOSCOPE

(71) Applicant: OLYMPUS CORPORATION, Tokyo (JP)

(72) Inventor: Koji Yamaya, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 416 days.

(21) Appl. No.: 17/871,326

(22) Filed: Jul. 22, 2022

(65) Prior Publication Data

US 2023/0000318 A1 Jan. 5, 2023

Related U.S. Application Data

(63) Continuation of application No. PCT/JP2020/002761, filed on Jan. 27, 2020.

(51) Int. Cl.
*A61B 1/00* (2006.01)

(52) U.S. Cl.
CPC ...... *A61B 1/00101* (2013.01); *A61B 1/00137* (2013.01)

(58) Field of Classification Search
CPC .......... A61B 1/00101; A61B 1/00137
See application file for complete search history.

(56) References Cited

U.S. PATENT DOCUMENTS

| 4,706,654 | A | * | 11/1987 | Ogiu | ........................ | A61B 1/05 |
| | | | | | | 348/E5.026 |
| 4,809,678 | A | * | 3/1989 | Klein | ................. | A61B 1/00142 |
| | | | | | | 604/263 |
| 6,605,033 | B1 | | 8/2003 | Matsuno | | |
| 11,510,555 | B2 | * | 11/2022 | Hosogoe | ................ | A61B 90/70 |

(Continued)

FOREIGN PATENT DOCUMENTS

| EP | 2022389 A1 | 2/2009 |
| JP | S5995313 U | 6/1984 |

(Continued)

OTHER PUBLICATIONS

International Search Report dated Apr. 7, 2020 issued in PCT/JP2020/002761.

*Primary Examiner* — Michael J Carey
*Assistant Examiner* — Megan Elizabeth Monahan
(74) *Attorney, Agent, or Firm* — Scully, Scott, Murphy & Presser, P.C.

(57) ABSTRACT

An endoscope includes a distal end portion main body arranged at a distal end portion of an insertion portion, the distal end portion main body including a recess, the distal end portion main body including at least one screw hole in at least one of a periphery of the recess or an interior of the recess, a lid configured to cover an opening of the recess, the lid including at least one through-hole at a position corresponding to the screw hole, a resin configured to fill a gap between the lid and the distal end portion main body, at least one screw configured to fix the lid to the distal end portion main body, the screw being inserted through the through-hole and screwed into the screw hole, at least one screw cover having an insulation property and configured to cover an upper surface of the screw, the screw cover being disposed closer to a proximal end side than to the recess, and a distal end cover configured to cover a part of the distal end portion main body.

19 Claims, 11 Drawing Sheets

(56) References Cited

U.S. PATENT DOCUMENTS

| | | | |
|---|---|---|---|
| 2004/0082836 A1* | 4/2004 | Hino | A61B 1/0008 |
| | | | 600/107 |
| 2009/0043166 A1 | 2/2009 | Ishii | |
| 2016/0270636 A1 | 9/2016 | Iwasaka et al. | |
| 2019/0133558 A1* | 5/2019 | Morimoto | A61B 8/12 |

FOREIGN PATENT DOCUMENTS

| | | | |
|---|---|---|---|
| JP | 2001000388 A | 1/2001 | |
| JP | 2004141315 A | 5/2004 | |
| JP | 2004141316 A | 5/2004 | |
| JP | 2007136044 A | 6/2007 | |
| JP | 2009039434 A | 2/2009 | |
| JP | 2016174822 A | 10/2016 | |
| JP | 2019115564 A | 7/2019 | |
| WO | 2019150633 A1 | 8/2019 | |

* cited by examiner

ENDOSCOPE

CROSS REFERENCE TO RELATED APPLICATION

This application is a continuation application of PCT/JP2020/002761 filed on Jan. 27, 2020, the entire contents of which are incorporated herein by this reference.

BACKGROUND OF THE INVENTION

1. Field of the Invention

The present invention relates to an endoscope including an insertion portion to be inserted into a subject.

2. Description of the Related Art

An endoscope including a movable member at a distal end portion of an insertion portion is known. For example, Japanese Unexamined Patent Application Publication No. 2004-141315 discloses an endoscope including a raising base (forceps elevator) for changing a protruding direction of a treatment instrument protruding from a distal end portion. A raising lever or the like which is a movable member for moving the raising base is accommodated in a recess of a distal end portion main body. An opening of the recess is covered by a protective plate (lid) fixed to the distal end portion main body by a screw.

International Publication No. WO2019/150633 proposes a method of curing a resin poured into a gap between a lid and a wall surface of a recess while abutting a protruding surface of the lid covering an opening of the recess of a distal end portion main body of an endoscope on the wall surface of the recess. According to the above method, the lid may be positioned and be firmly fixed to the recess.

SUMMARY OF THE INVENTION

An endoscope of an embodiment includes a distal end portion main body arranged at a distal end portion of an insertion portion, the distal end portion main body including a recess, the distal end portion main body including at least one screw hole in at least one of a periphery of the recess or an interior of the recess, a lid configured to cover an opening of the recess, the lid including at least one through-hole at a position corresponding to the screw hole, a resin configured to fill a gap between the lid and the distal end portion main body, at least one screw configured to fix the lid to the distal end portion main body, the screw being inserted through the through-hole and screwed into the screw hole, at least one screw cover having an insulation property and configured to cover an upper surface of the screw, the screw cover being disposed closer to a proximal end side than to the recess, and a distal end cover configured to cover a part of the distal end portion main body.

DETAILED DESCRIPTION OF THE PREFERRED EMBODIMENT(S)

First Embodiment

<Configuration of Endoscope>

Figure 1:
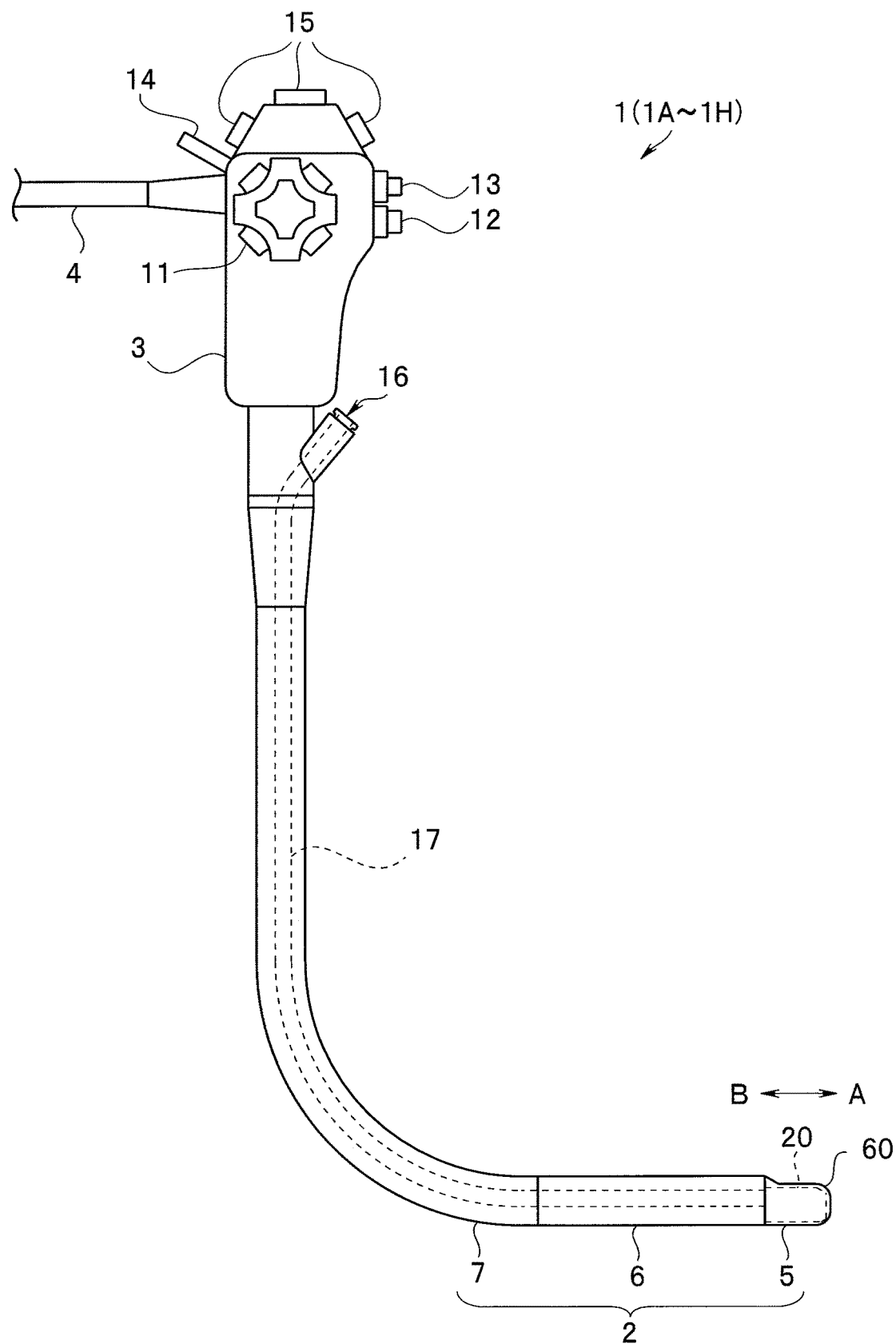
FIG. 1 is a diagram illustrating a configuration of an endoscope according to an embodiment.

An endoscope 1 of an embodiment illustrated in FIG. 1 is, for example, a side-view type endoscope for the duodenum having an insertion portion 2 to be inserted into the body.

In the following description, the drawings based on each of the embodiments are schematic views. The relationship between a thickness and a width of each portion, a ratio of the thickness, a relative angle, and the like of each portion are different from the actual configuration. The drawings also include portions having mutually different dimensional relationships and ratios to each other. Illustrations of some components and assignment of reference numerals are omitted. A side closer to a distal end than a proximal end of the insertion portion 2 is referred to as a distal end side A, and a side opposite to the distal end side A is referred to as a proximal end side B.

The endoscope 1 includes the insertion portion 2, an operation portion 3 provided on the proximal end side B of the insertion portion 2, and a universal cord 4 extending from the operation portion 3.

In the insertion portion 2, a distal end portion 5, a bending portion 6, and a flexible portion 7 are consecutively connected. The distal end portion 5 is disposed at a distal end of the insertion portion 2. The bending portion 6 is disposed at the proximal end side B of the distal end portion 5. The flexible portion 7 connects the proximal end side B of the bending portion 6 and the operation portion 3. A distal end portion main body 20 of the distal end portion 5 is partially covered by a distal end cover 60.

The operation portion 3 is provided with a bending operation dial 11, an air/water feeding button 12, a suction button 13, a raising base operation lever 14, and an operation switch 15. The bending portion 6 bends in accordance with a rotation of the bending operation dial 11. The operation switch 15 is an electronic switch for operating an image pickup portion (not illustrated).

The operation portion 3 is provided with a treatment instrument insertion port 16 for inserting a treatment instrument (not illustrated) into the body. The proximal end side B of a channel tube 17 is connected to the treatment instrument insertion port 16. The distal end side A of the channel tube 17 is open at the distal end portion 5 of the insertion portion 2.

A raising base operation wire 18 (not illustrated in FIG. 1) is inserted through the insertion portion 2. The raising base operation wire 18 moves forward and backward in accordance with an operation of the raising base operation lever 14. As will be described later, a distal end of the raising base operation wire 18 is connected to a movable member 51 (see FIG. 5) accommodated in a recess C51 of the distal end portion main body 20.

<Configuration of Distal End Portion>

Figure 2:
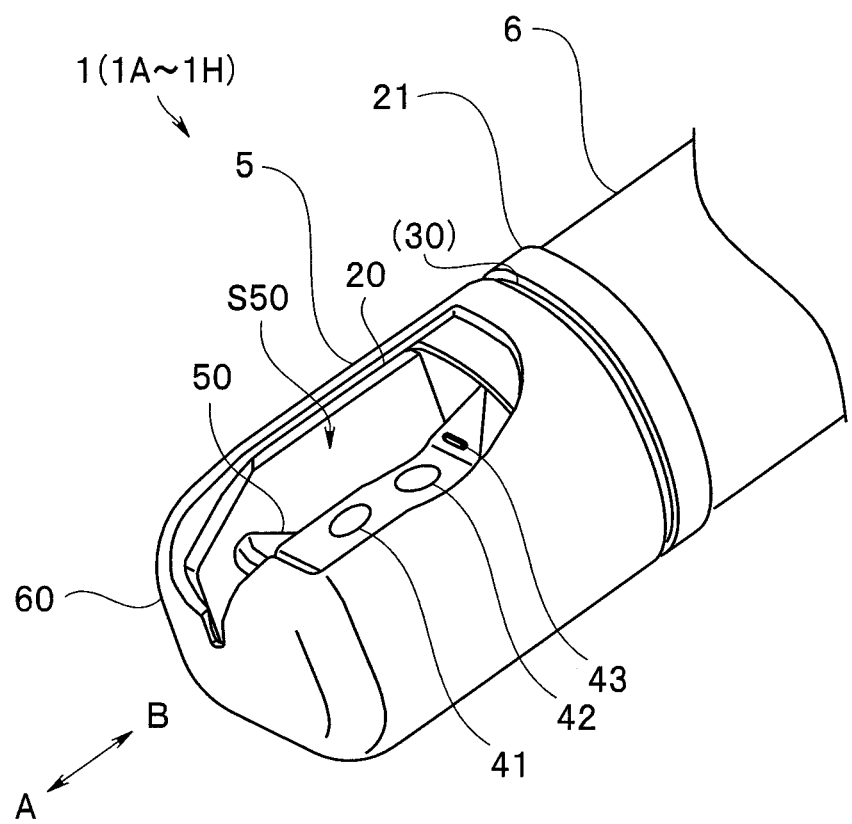
FIG. 2 is a perspective view of a distal end portion of an insertion portion of the endoscope according to the embodiment.
Figure 3:
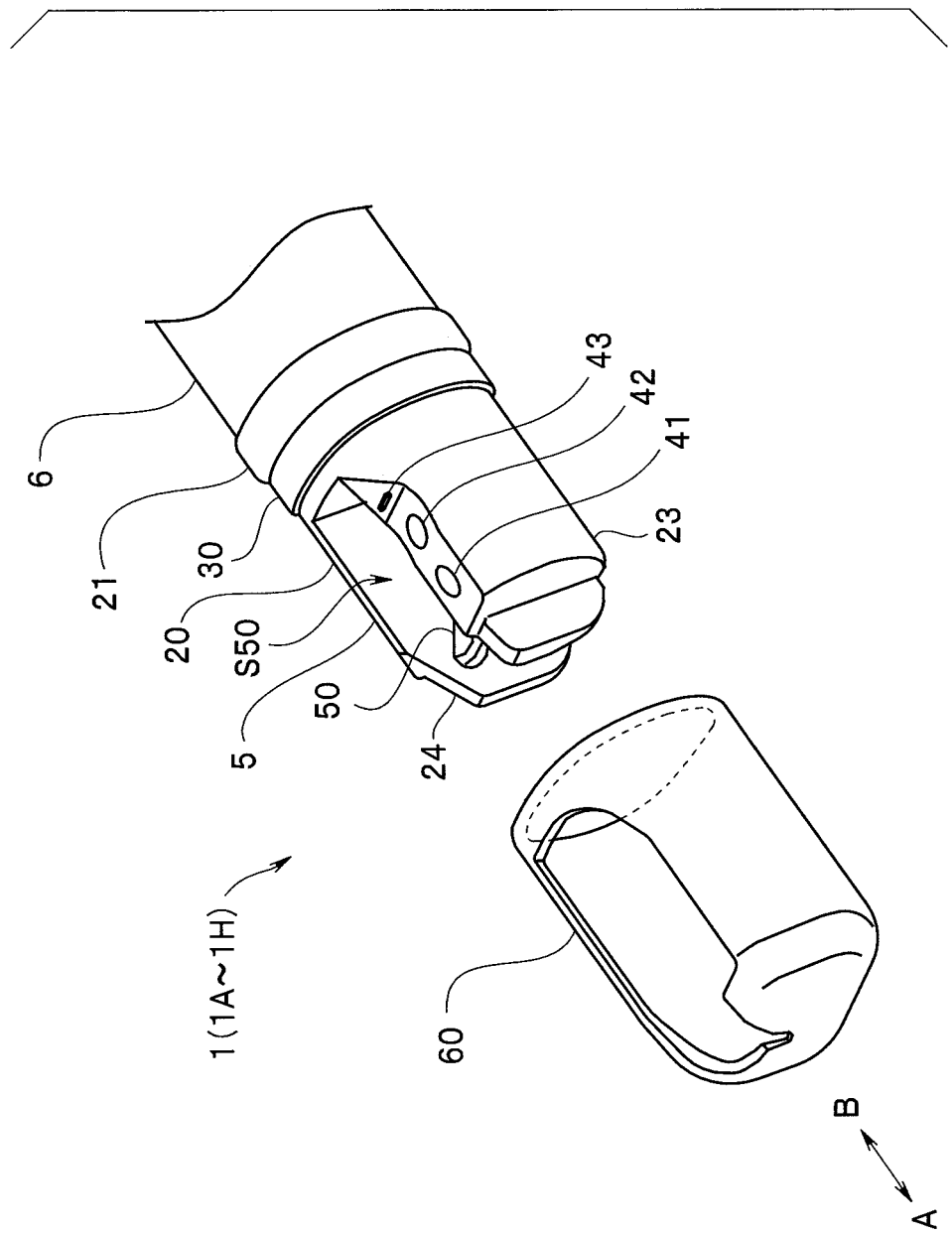
FIG. 3 is an exploded perspective view of the distal end portion of the insertion portion of the endoscope according to the embodiment.
Figure 4:
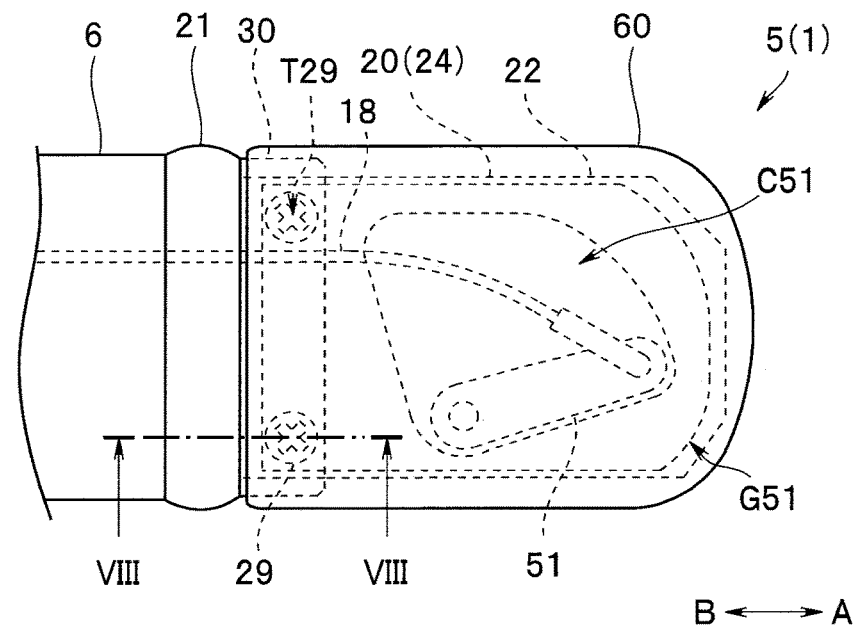
FIG. 4 is a side view of a distal end portion of an endoscope according to a first embodiment.

As illustrated in FIGS. 2 and 3, the distal end cover 60 is attached to the distal end portion main body 20 which is a main member of the distal end portion 5 of the endoscope 1. The distal end cover 60 is a sheath-shaped resin member that covers a part of an outer surface of the distal end portion main body 20.

The distal end portion main body 20 is a rigid member made of metal such as stainless steel. The bending portion 6 is consecutively connected to the distal end portion main body 20 arranged at the distal end of the insertion portion 2. An outer skin of the bending portion 6 is fixed to the distal end portion main body 20 by a reel member 21. An insulation ring 30 made of resin or ceramics has an electrical insulation property. When a high frequency treatment instrument is used, a high frequency current may leak out to the distal end portion main body 20. The insulation ring 30 surrounding an outer circumference of the distal end portion main body 20 insulates the distal end portion main body 20.

The distal end portion main body 20 includes a pair of arm portions (first arm portion 23 and second arm portion 24) protruding toward the distal end side A. The raising base 50 is accommodated in a raising base accommodation space S50 between the first arm portion 23 and the second arm portion 24. The raising base 50 is used to manipulate a protruding direction of the treatment instrument (not illustrated). The treatment instrument is inserted into the channel tube 17 from the treatment instrument insertion port 16 and protrudes from an opening of the distal end portion 5.

An illumination lens 41, an image pickup lens 42, and a cleaning nozzle 43 are disposed on an upper surface of an arm portion of the first arm portion 23. The illumination lens 41 emits illumination light toward a subject of the image pickup lens 42. The cleaning nozzle 43 ejects a fluid for removing adhering substances toward the illumination lens 41 and the image pickup lens 42.

Figure 5:
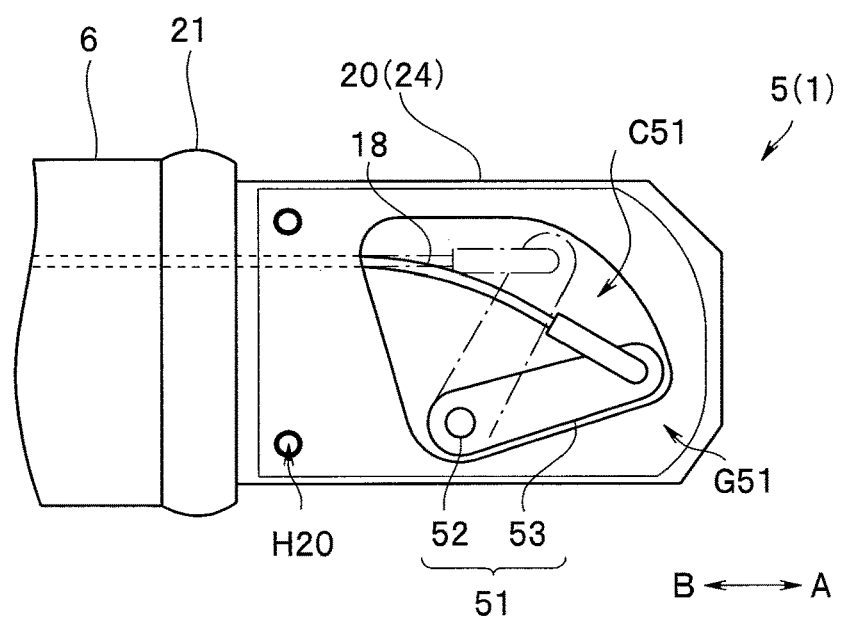
FIG. 5 is a side view before a lid is attached to the distal end portion of the endoscope according to the first embodiment.

The recess C51 in which the movable member 51 for moving the raising base 50 is accommodated is provided on an outer side surface of the second arm portion 24 (see FIG. 5). That is, the recess C51 configures a space for accommodating the movable member 51. The movable member 51 transmits movement of the raising base operation wire 18 to the raising base 50.

The distal end cover 60 has an opening that exposes the raising base accommodation space S50 in a state in which the distal end cover 60 is attached to the distal end portion main body 20. The illumination lens 41, the image pickup lens 42, and the cleaning nozzle 43 are also exposed in an opening of the distal end cover 60. That is, the distal end cover 60 covers a part of the distal end portion main body 20.

Next, with reference to FIGS. 4 to 7, the recess C51 serving as a movable member accommodation space, the movable member 51 accommodated in the recess C51, and a lid 22 covering an opening of the recess C51 will be described.

The movable member 51 is held in a movable state with respect to the distal end portion main body 20 and is accommodated in the recess C51. To be specific, a bearing (not illustrated) is disposed on a bottom surface of the recess C51. The bearing rotatably supports a shaft 52 of the movable member 51. The movable member 51 includes a raising lever 53 extending from the shaft 52. The raising lever 53 rotates about the shaft 52.

The distal end of the raising base operation wire 18 is connected to the raising lever 53. The raising base operation wire 18 inserted through the insertion portion 2 moves forward and backward in accordance with the operation of the raising base operation lever 14 of the operation portion 3. Therefore, as indicated by a dashed line in FIG. 5, the raising lever 53 rotates about the shaft 52 in accordance with an operation of the raising base operation lever 14.

The raising base 50 is fixed to a portion of the shaft 52 extending into the raising base accommodation space S50. Therefore, the raising base 50 rotates together with the raising lever 53 in accordance with the rotation of the shaft 52. That is, the raising base 50 rotates about the shaft 52 in accordance with the operation of the raising base operation lever 14.

The raising base 50 is a lingulate member extending from the shaft 52. The channel tube 17 is opened on a proximal end side B of the raising base 50 in the raising base accommodation space S50. When the raising base 50 is rotated, the protruding angle (protruding direction) of the treatment instrument inserted through the channel tube 17 and arranged on the raising base 50 is changed.

<Fixing Lid>

Figure 6:
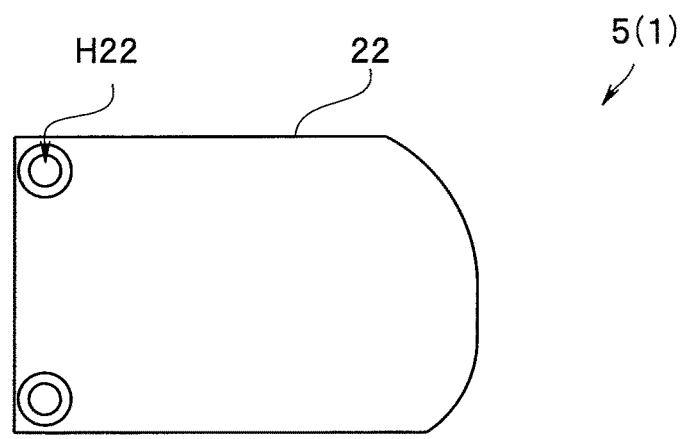
FIG. 6 is a top view of the lid of the endoscope according to the first embodiment.

On the proximal end side B in the periphery of the recess C51 of the distal end portion main body 20, two screw holes H20 are provided. On the other hand, as illustrated in FIG. 6, the lid 22 includes respective through-holes H22 in the positions (proximal end side B) corresponding to each screw hole H20. The lid 22 is a rigid member made of metal such as stainless steel. At least one of the distal end portion main body 20 or the lid 22 may be made of a rigid resin. Further, as long as at least one of the two screw holes H20 is positioned on the proximal end side B of the recess C51, at least one of the two screw holes H20 may be positioned inside the proximal end side B of the recess C51. For example, the screw hole H20 may be provided in a member fixed to the bottom surface of the recess C51 or inside the recess C51 (such as a screw receiving member (not illustrated) separate from the distal end portion main body 20).

Figure 7:
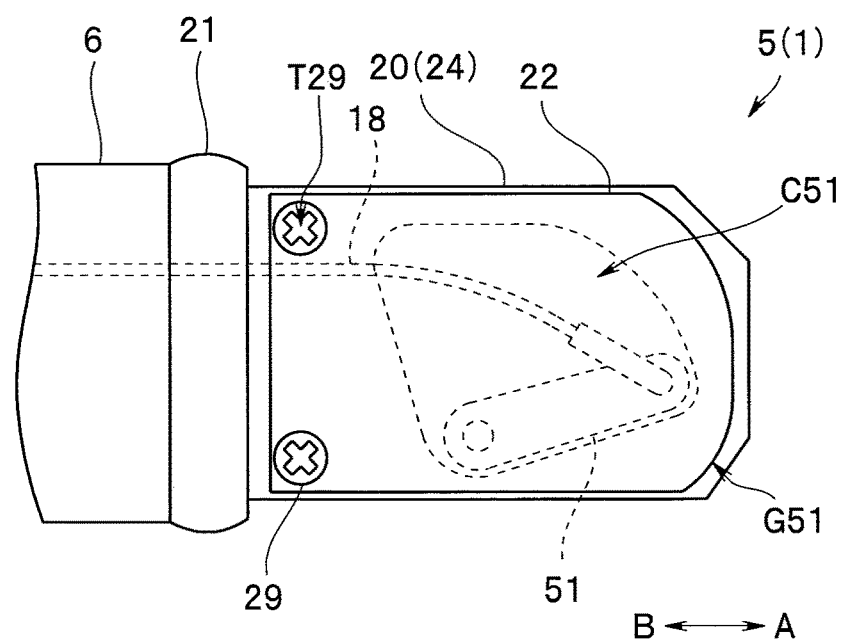
FIG. 7 is a side view before an insulation ring is attached to the distal end portion of the endoscope according to the first embodiment.
Figure 8:
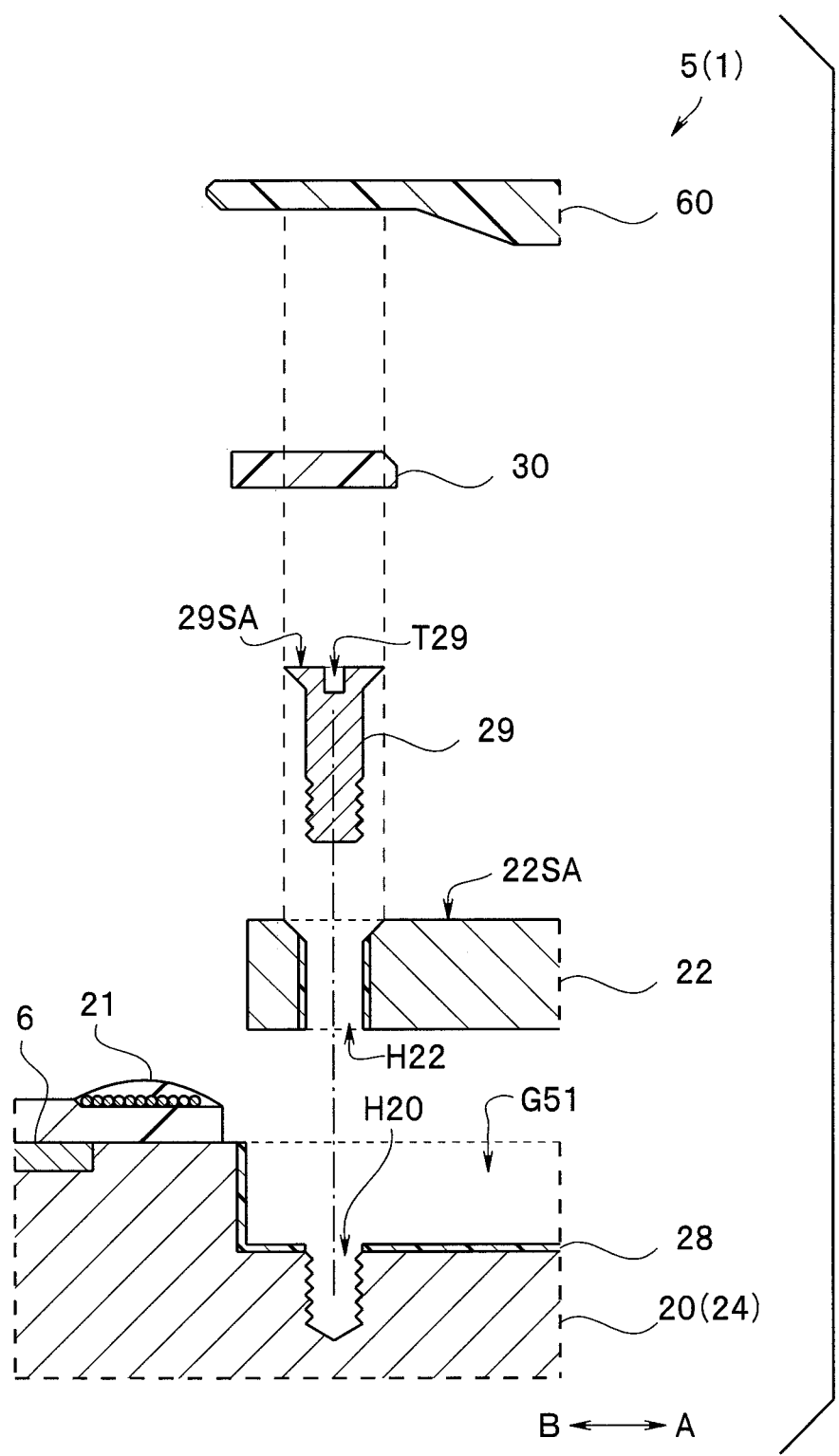
FIG. 8 is an exploded cross-sectional view taken along a line VIII-VIII of FIG. 4.

As illustrated in FIGS. 7 and 8, the lid 22 is fixed in a state of entirely covering the opening of the recess C51 by a screw 29 inserted through the through-hole H22 and screwed into the screw hole H20.

The through-hole H22 is a clearance hole having an inner diameter slightly larger than an outer diameter of the screw 29. The screw 29 is a countersunk head screw. On an upper surface side of the through-hole H22, a countersink having the same size as the size of the seat surface of the screw 29 is provided. When the screw 29 is screwed into the screw hole H20, the seat surface of the screw 29 abuts on the countersink of the through-hole H22. Therefore, the lid 22 is accurately positioned in a state in which the central axis of the through-holes H22 coincides with the central axis of the screws 29. There are almost no gaps and no steps between an upper surface 29SA of the head portion of the screw 29 (screw upper surface) and a front surface 22SA of the lid 22 (see FIG. 8).

In the periphery of the opening of the recess C51 of the distal end portion main body 20, a thermosetting resin 28 is disposed before the lid 22 is disposed. The resin 28 is disposed in a gap between the lid 22 and the periphery of the opening of the recess C51 of the distal end portion main body 20. After the lid 22 is fixed by the screw 29, a curing process of the resin 28 is performed. The lid 22 fixed by the screw 29 is not likely to move when the curing process of the resin 28 is performed. Therefore, the endoscope 1 has good workability during the manufacturing. Further, the recess C51 is surely sealed by the resin 28. Therefore, the endoscope 1 has excellent watertightness and high reliability.

In the endoscope 1, a groove GM including a bottom surface with substantially the same outer shape as the outer shape of the lid 22 is provided in the periphery of the opening of the recess C51. The lid 22 is fitted into the groove G51. The depth of the groove G51 slightly exceeds the thickness of the lid 22, and the inner dimension of the bottom surface of the groove G51 is slightly larger than the outer dimension of the lid 22. Therefore, there are no gaps and no steps between the front surface 22SA of the lid 22 disposed on the groove G51 and the outer side surface of the second arm portion 24 of the distal end portion main body 20. However, in the endoscope of the present invention, the groove G51 is not essential in the configuration of the distal end portion main body 20.

After the lid 22 is fixed by the screw 29, when there is a further gap between the groove G51 and the lid C22, the gap is filled with the resin 28, and then the curing process of the resin 28 is performed. In the endoscope 1, the space between the lower surface of the lid C22 and the bottom surface of the groove G51 in the periphery of the recess C51 is also filled with the resin. Therefore, the endoscope 1 has excellent watertightness and high reliability.

For example, in a so-called crosshead screw, a cross-shaped groove T29 for inserting a screwdriver is provided on a screw upper surface 29SA. Therefore, foreign matters in the groove T29 cannot be completely removed easily when the distal end cover 60 is removed and the distal end portion main body 20 is cleaned. In addition, when the endoscope is used and water enters the groove T29, the insulation property may be lowered.

The insulation ring 30 is firmly fixed to the distal end portion main body 20 by an adhesive (not illustrated). Unlike the distal end cover 60 which is attached and detached during normal cleaning, the insulation ring 30 is not removed during cleaning. For this reason, in the endoscope 1, since foreign matters do not enter the groove T29 of the screw 29, workability at the time of cleaning is good.

In the endoscope 1, the screw 29 (screw hole H20 and through-hole H22) is disposed only on the proximal end side B in the periphery of the recess C51 of the distal end portion main body 20. Therefore, an upper surface of the screw 29 is covered with the insulation ring 30 surrounding the proximal end side B of the distal end portion main body 20. In the endoscope 1, the insulation ring 30 is a screw cover that covers the screw upper surface 29SA. That is, in the endoscope 1, the insulation ring 30 disposed for insulation of the distal end portion main body 20 is also used as the screw cover. The insulation ring 30 which is the screw cover covering the screw 29 is disposed only on the proximal end side B relative to the recess C51. The insulation ring 30 disposed on the upper part of the through-hole H22 is larger in size than the outer diameter of the upper surface of the screw 29 and covers the upper surface of the screw 29. The lid C22 may be fixed to the distal end portion main body 20 by three or more screws 29 disposed only on the proximal end side B.

Modified Example of First Embodiment

An endoscope 1A of a first modified example of the first embodiment, an endoscope 1B of a second modified example of the first embodiment, and an endoscope 1C of a third modified example of the first embodiment are similar to the endoscope 1 and have the same effects as the endoscope 1. Therefore, components having the same functions as those of the endoscope 1 are denoted by the same reference numerals, and description thereof will be omitted.

First Modified Example of First Embodiment

Figure 9:
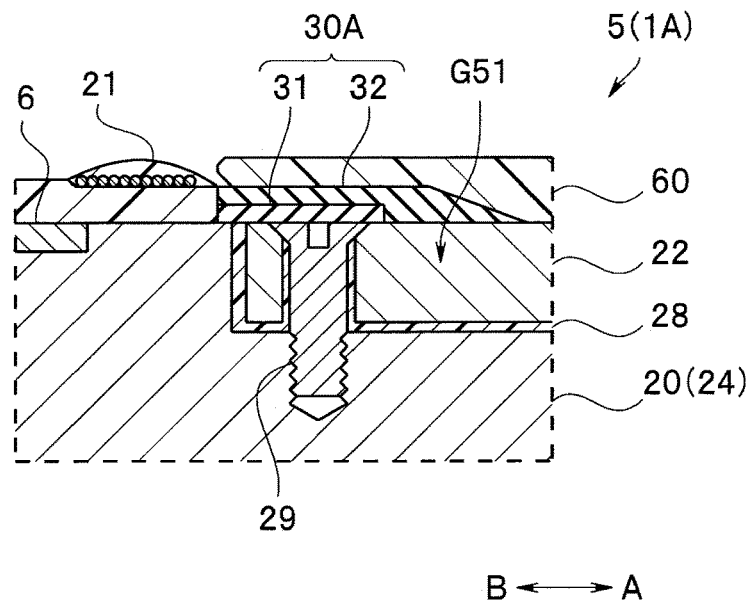
FIG. 9 is a partial cross-sectional view of a distal end portion of an endoscope according to a first modified example of the first embodiment.

In the endoscope 1A of the modified example illustrated in FIG. 9, an insulation ring 30A is configured by two types of insulation rings (first ring 31 and second ring covering first ring 31) having different rigidities. The first ring 31 (hereinafter referred to as "rigid ring 31") is, for example, made of ceramics having an insulation property. The second ring 32 (hereinafter referred to as "flexible ring 32") is made of resin having an insulation property. The flexible ring 32 (second ring 32) has higher flexibility than the rigid ring 31 (first ring 31). Flexibility (rigidity) is measured, for example, by Young's modulus (ISO 527-2). Opposite to the insulation ring 30A, the flexible ring 32 may be disposed on the inner side and the rigid ring 31 may be disposed on the outer side.

The insulation ring 30A configured of two types of rings having different rigidities is difficult to be broken even when receiving an impact from the outside. Therefore, the endoscope 1A has higher reliability than the endoscope 1.

Second Modified Example of First Embodiment

Figure 10:
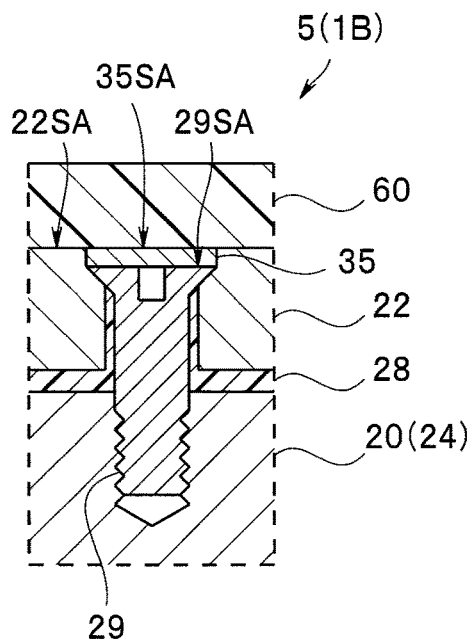
FIG. 10 is a partial cross-sectional view of a distal end portion of an endoscope according to a second modified example of the first embodiment.

In the endoscope 1B of the modified example illustrated in FIG. 10, the screw upper surface 29SA is covered with the screw cover 35. The screw cover 35 is a separate member from the insulation ring 30. A cylindrical space into which the screw cover 35 having the same outer diameter as the countersink is fitted is formed above the countersink of the through-hole H22 of the lid 22. An upper surface (cover upper surface) 35SA of the screw cover 35 is a flat surface without unevenness, and there are no gaps and no steps between the cover upper surface 35SA and the front surface 22SA of the lid 22. The outer diameter of the screw cover 35 disposed above the through-hole H22 is the same as the outer diameter of the screw upper surface 29SA.

The material of the screw cover 35 is preferably a resin or ceramics having an insulation property. In addition, the groove T29 of the screw 29 may be filled with the screw cover 35.

Third Modified Example of First Embodiment

Figure 11:
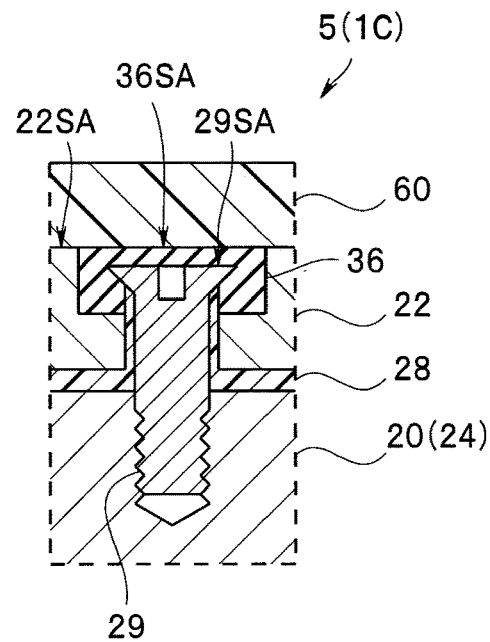
FIG. 11 is a partial cross-sectional view of a distal end portion of an endoscope according to a third modified example of the first embodiment.
Figure 12:
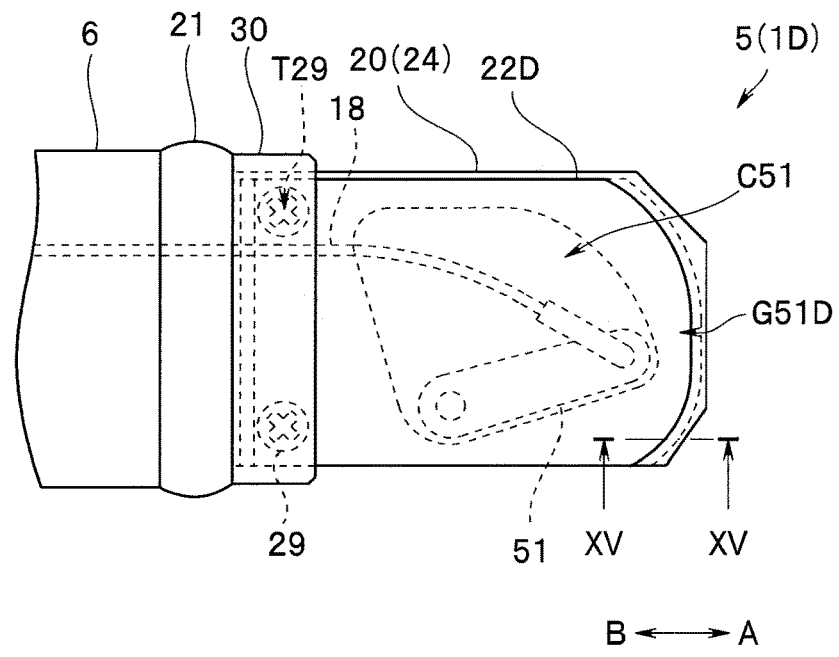
FIG. 12 is a side view before an insulation ring is attached to a distal end portion of an endoscope according to a second embodiment.
Figure 13:
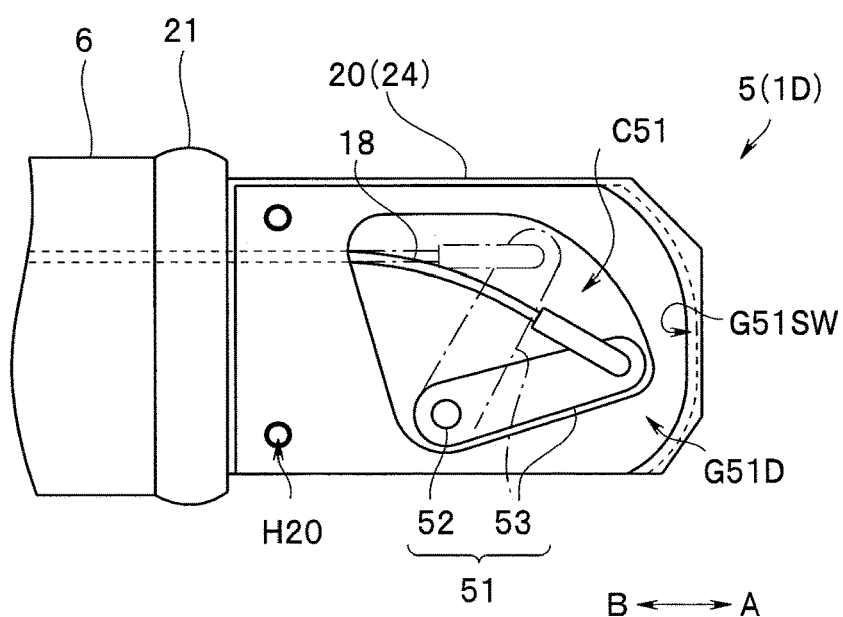
FIG. 13 is a side view before a lid is attached to the distal end portion of the endoscope according to the second embodiment.
Figure 14:
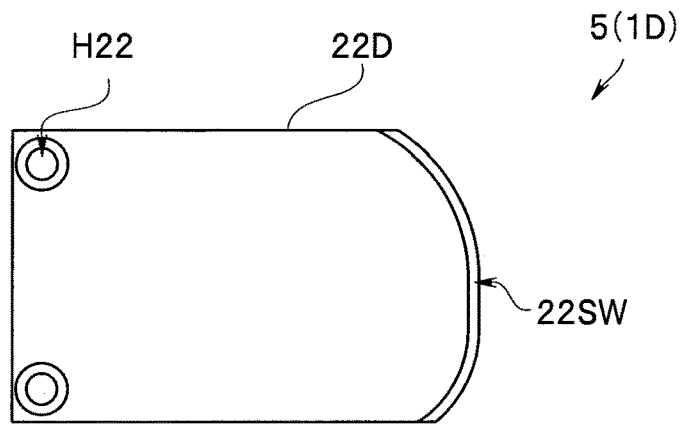
FIG. 14 is a top view of the lid of the endoscope according to the second embodiment.

In the endoscope 1C of a modified example illustrated in FIG. 11, the screw upper surface 29SA is covered with a screw cover 36 in a similar manner with the endoscope 1B. A space into which the screw cover 36 having an outer diameter larger than the outer diameter of the countersink is fitted is formed above the through-hole H22 of the lid 22. In the screw cover 36, a cover upper surface 36SA is a flat surface without unevenness, and there are no gaps and no steps between the cover upper surface 36SA and the front surface 22SA of the lid 22. The size of the screw cover 35 disposed above the through-hole H22 is larger than the outer diameter of the screw upper surface 29SA.

In the endoscopes 1B and 1C illustrated in FIGS. 10 and 11, the screw covers 35 and 36 are not covered with the insulation ring 30 but are covered only with the distal end cover 60. In the endoscopes 1B and 1C, a plurality of screws 29 and the screw covers 35 and 36 are disposed only on the proximal end side in the periphery of the recess C51. The screw covers 35 and 36 disposed on the proximal end side in the periphery of the recess C51 may be covered with the insulation ring 30 and the distal end cover 60.

Second Embodiment

An endoscope 1D of the present embodiment is similar to the endoscope 1 or the like and has the same effect as the endoscope 1 or the like. Therefore, components having the same functions as those of the endoscope 1 or the like are denoted by the same reference numerals, and description thereof will be omitted.

Figure 15:
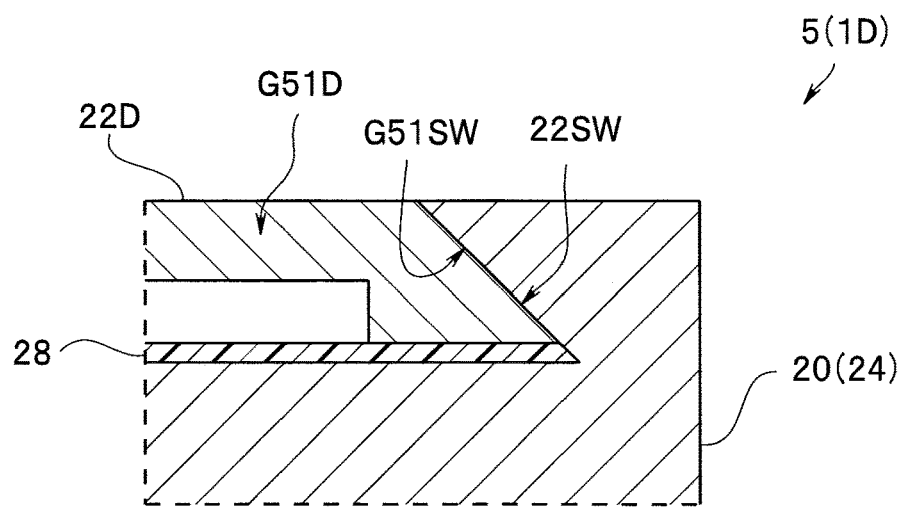
FIG. 15 is an exploded cross-sectional view taken along a line XV-XV of FIG. 12.

In the endoscope 1D illustrated in FIGS. 12 to 15, a groove G51D having a bottom surface with substantially the same outer shape (size) as the outer shape (size) of a lid 22D is provided in the periphery of the opening of the recess C51. In the endoscopes 1A to 1C, a groove wall surface of the groove G51 and a lid wall surface of the lid 22 are perpendicular to the bottom surface of the groove G51. In contrast, as illustrated in FIG. 15, in the endoscope 1D, a first groove wall surface G51SW on the distal end side A of the groove G51D is an inclined surface (first recessed surface) recessed downward (bottom surface direction of the groove G51D). On the other hand, a lid wall surface 22SW on the distal end side A of the lid 22D is an inclined surface (first protruding surface) protruding downward. The first groove wall surface G51SW and a first lid wall surface 22SW abut against each other.

In a state where the first lid wall surface 22SW of the lid 22D is inserted into the first groove wall surface G51SW of the groove G51D, the two screws 29 arranged on the proximal end side B are inserted through the respective through-holes H22 and are inserted into the screw holes H20. When the screw 29 is screwed into the screw hole H20, the seat surface of the screw 29 abuts on the countersink of the screw hole H20, so that the first lid wall surface 22SW is urged against the first groove wall surface G51SW. The first lid wall surface 22SW and the first groove wall surface G51SW abut against each other in a pressed state.

That is, when the screw 29 disposed only on the proximal end side B with respect to an opening C51 is tightened, a distal end side A of the lid 22 moves upward, and there is a possibility that a gap between a lower surface of the lid 22 and a bottom surface of the groove G51D is widened. On the other hand, in the endoscope 1D, since the first lid wall surface 22SW and the first groove wall surface G51SW abut against each other in a pressed state, the distal end side A of the lid 22 does not move upward when the screw 29 is tightened. Therefore, the endoscope 1D has better workability and higher reliability than the endoscope 1 or the like.

Modified Example of Second Embodiment

An endoscope 1E of a first modified example of the second embodiment, an endoscope 1F of a second modified example of the second embodiment, and an endoscope 1G of a third modified example of the second embodiment are similar to the endoscope 1D. Therefore, components having the same functions as those of the endoscope 1D are denoted by the same reference numerals, and description thereof will be omitted.

Figure 16:
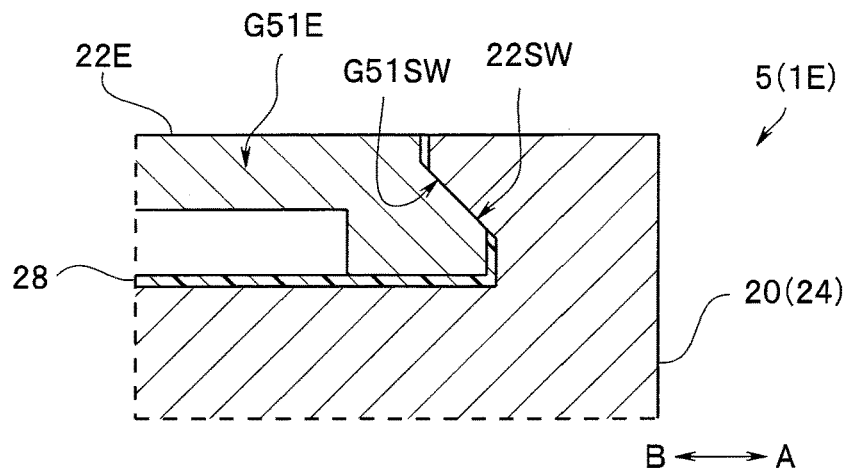
FIG. 16 is a partial cross-sectional view of a distal end portion of an endoscope according to a first modified example of the second embodiment.

In the endoscope 1E of the first modified example illustrated in FIG. 16, the distal end side A of a groove G51E is the first groove wall surface G51SW recessed downward. A part of the first groove wall surface G51SW is an inclined surface (first recessed surface). On the other hand, the first lid wall surface 22SW on the distal end side A of a lid 22E is the first lid wall surface 22SW protruding downward. A part of the first lid wall surface 22SW is an inclined surface (first protruding surface). The inclined surface of the first groove wall surface G51SW and the inclined surface of the first lid wall surface 22SW abut against each other in a pressed state.

Figure 17:
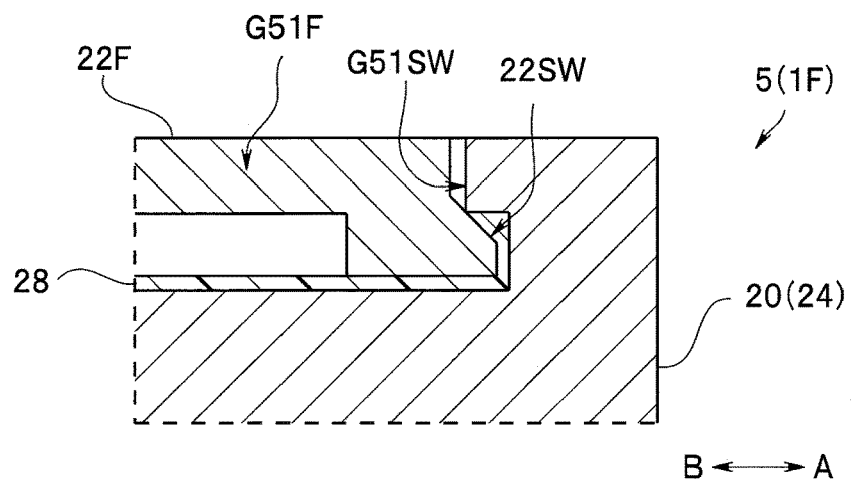
FIG. 17 is a partial cross-sectional view of a distal end portion of an endoscope according to a second modified example of the second embodiment.

In the endoscope 1F of the second modified example illustrated in FIG. 17, the first groove wall surface G51SW on the distal end side A of the groove G51F is a first recessed surface recessed downward. On the other hand, the first lid wall surface 22SW on the distal end side A of a lid 22F is a first protruding surface protruding downward, and a part thereof is an inclined surface. A corner of the first groove wall surface G51SW and the first lid wall surface 22SW abut against each other in a pressed state.

Figure 18:
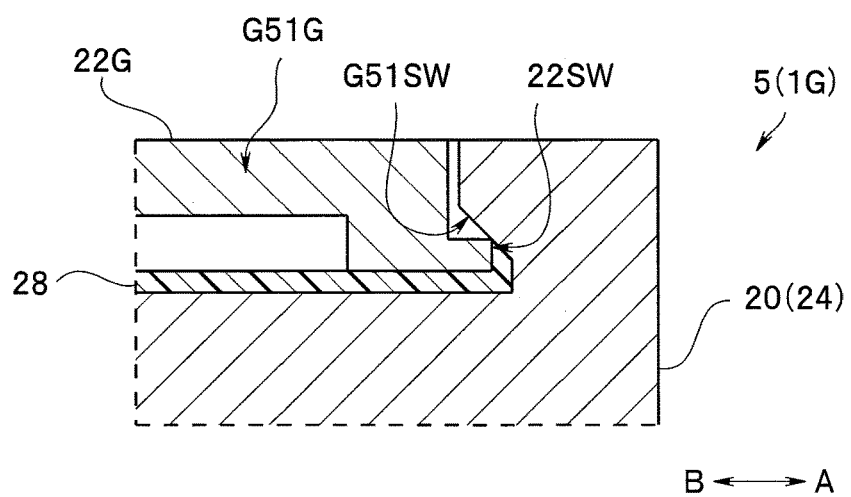
FIG. 18 is a partial cross-sectional view of a distal end portion of an endoscope according to a third modified example of the second embodiment.

In the endoscope 1G of the third modified example illustrated in FIG. 18, the first groove wall surface G51SW on the distal end side A of a groove G51G is a first recessed surface partially recessed downward. On the other hand, a part of the first lid wall surface 22SW on the distal end side A of a lid 22G is a first protruding surface which is protruding. Then, the inclined surface of the first groove wall surface G51SW and a corner of the first lid wall surface 22SW abut against each other in a pressed state.

That is, in the endoscopes 1E to 1G, at least one of the groove wall surface or the lid wall surface has an inclined surface, and the inclined surface abuts on the groove wall surface or the lid wall surface in a pressed state against the groove wall surface or the lid wall surface. Thus, the endoscopes 1E to 1G have the same effect as the endoscope 1D.

Third Embodiment

An endoscope 1H of the present embodiment is similar to the endoscope 1D or the like and has the same effect as the endoscope 1D or the like. Therefore, components having the same functions as those of the endoscope 1D or the like are denoted by the same reference numerals, and description thereof will be omitted.

Figure 19:
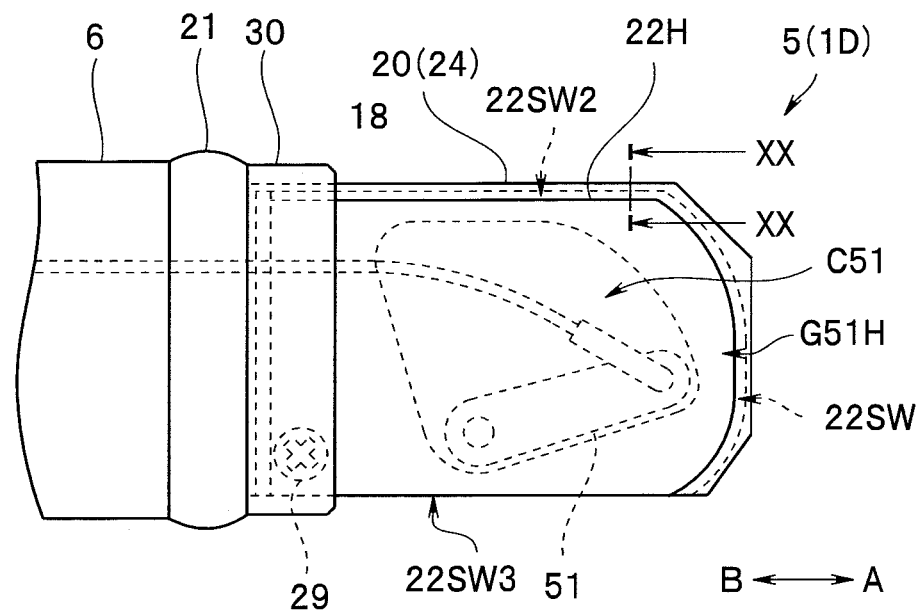
FIG. 19 is a side view before a distal end cover is attached to a distal end portion of an endoscope according to a third embodiment.
Figure 20:
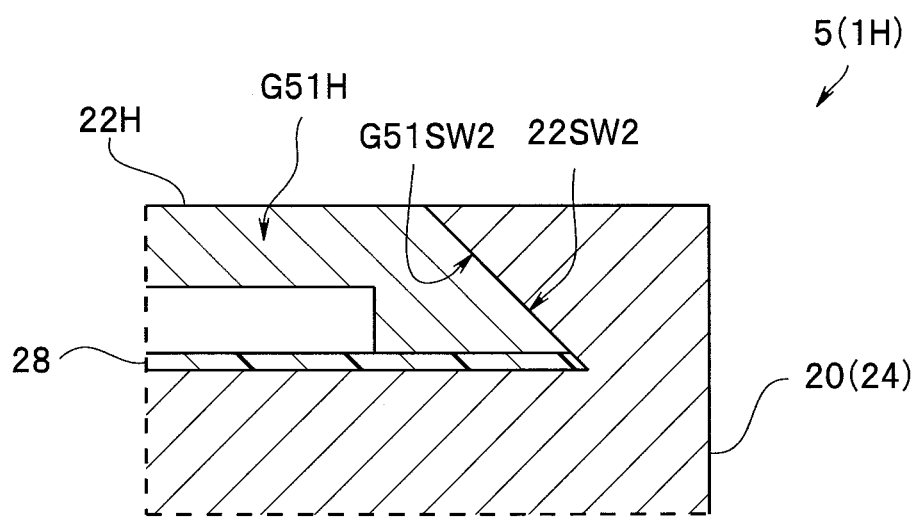
FIG. 20 is a partial cross-sectional view of the distal end portion of the endoscope according to the third embodiment.

In the endoscope 1H illustrated in FIGS. 19 and 20, similar to the endoscope 1D, a groove G51H having substantially the same size as the lid 22D is provided in the periphery of the opening of the recess C51. FIG. 20 is a cross-sectional view taken along a line XX-XX of FIG. 19. The first groove wall surface G51SW on the distal end side A of the groove G51H is an inclined surface (first recessed surface) recessed downward. On the other hand, the first lid wall surface 22SW on the distal end side A of a lid 22H is an inclined surface (first protruding surface) protruding downward. The first groove wall surface G51SW and the first lid wall surface 22SW abut against each other in a pressed state.

Furthermore, in the endoscope 1H, a second groove wall surface G51SW2 on one side surface side (upper side in FIG. 19) of the groove G51H is an inclined surface (second recessed surface) recessed downward. On the other hand, a second lid wall surface 22SW2 on one side surface side of the lid 22H is an inclined surface (second protruding surface) protruding downward. In addition, the second groove wall surface G51SW2 and the second lid wall surface 22SW2 abut against each other in a pressed state.

As illustrated in FIG. 19, in the endoscope 1H, the lid 22H is fixed to the distal end portion main body 20 by one screw 29. One screw 29 is arranged at a position closer to the proximal end side B than the opening C51 and closer to a third wall surface 22SW3 (wall surface facing second lid wall surface 22SW2) than the second groove wall surface G51SW2. The endoscope 1H has better workability than the endoscope 1 or the like. When the screw 29 is tightened, not only the first lid wall surface 22SW is urged against the first groove wall surface G51SW, but also the second lid wall surface 22SW2 is urged against the second groove wall surface G51SW2.

Note that the second recessed surface and the second protruding surface of the groove of the endoscope 1H may have the same configuration as the first recessed surface and the first protruding surface of the endoscopes 1E to 1G, respectively.

In the above embodiments and modified examples, the medical flexible endoscope (flexible endoscope) 1, 1A to 1H, has been described as examples. However, the endoscope of the present invention may be an industrial endoscope, a rigid endoscope, or a wireless endoscope without a universal cord.

The present invention is not limited to the embodiments described above, and various changes and modifications can be made without departing from the spirit and scope of the present invention.

What is claimed is:

1. An endoscope comprising:
  a distal end rigid body arranged at a distal end portion of an insertion portion, the distal end rigid body comprising:
    a recess formed in the distal end rigid body, and
    a screw hole in at least one of a periphery of the recess or an interior of the recess;
  a lid configured to cover an opening of the recess, the lid including a through-hole at a position corresponding to the screw hole;
  a resin disposed in a gap between the lid and the distal end rigid body;
  a screw configured to fix the lid to the distal end rigid body, the screw being inserted through the through-hole and screwed into the screw hole; and
  a screw cover having an insulation property and configured to cover an upper surface of the screw, the screw cover being disposed closer to a proximal end side of the distal end rigid body than to the recess;
  wherein the screw cover extends distally to only cover the screw and not cover portions of the distal end rigid body distal to the screw.

2. The endoscope according to claim 1, wherein the screw cover is an insulation ring surrounding an outer circumference of the distal end rigid body.

3. The endoscope according to claim 2, wherein the insulation ring includes a first ring having a first flexibility and a second ring having a second flexibility greater than the first flexibility.

4. The endoscope according to claim 1, wherein an upper surface of the screw cover is a flat surface, and the upper surface of the screw cover directly abuts a corresponding surface of the lid.

5. The endoscope according to claim 1, wherein
  the recess has a bottom surface larger than an opening of the recess to define a sidewall of the recess;
  the protruding surface is an inclined surface of the lid with an inclined shape to mate with the sidewall of the recess; and
  the inclined surface of the lid and the sidewall of the recess mate to retain an edge of the lid within the recess.

6. The endoscope according to claim 5, wherein
  the screw hole comprises two screw holes in at least one of the periphery of the recess or the interior of the recess and each of the two screw holes are arranged on a proximal end side relative to the opening;
  the through-hole comprises two through holes,
  the screw comprises two screws at positions corresponding to the two screw holes, respectively, and
  the lid is fixed to the distal end portion main rigid body by the two screws arranged on the proximal end side relative to the opening.

7. The endoscope according to claim 5, wherein the inclined surface and the sidewall abut against each other when the lid is fixed in the distal end rigid body.

8. The endoscope according to claim 5, wherein
  the groove further comprises a second recessed surface on a side surface side of the groove,
  the lid further comprises a second protruding surface on a side surface side of the lid,
  at least one of the second recessed surface or the second protruding surface has an inclined surface,
  the inclined surface abuts on the second recessed surface or the second protruding surface, and
  the lid is fixed to the distal end rigid body by only one screw disposed at a position closer to a proximal end side than the opening and closer to a third lid wall surface on a side opposite to the second lid wall surface across the recess than the second lid wall surface.

9. The endoscope according to claim 8, wherein
  the second recessed surface comprises a first inclined surface,
  the second protruding surface comprises a second inclined surface, and
  the first inclined surface and the second inclined surface abut against each other when the lid is fixed in the distal end rigid body.

10. The endoscope according to claim 1, wherein the screw cover having a size equal to or larger than an outer diameter of an upper surface of the screw is disposed on upper surface of the screw.

11. The endoscope according to claim 1, wherein the screw hole comprises two or more screw holes.

12. The endoscope according to claim 11, wherein the through-hole comprises two or more through-holes.

13. The endoscope according to claim 12, wherein
the screw comprises two or more screws; and
the screw cover comprises two or more screw covers.

14. The endoscope according to claim 1, wherein the resin is disposed on a surface around the opening of the recess.

15. The endoscope according to claim 14, wherein the resin surrounds the screw hole.

16. The endoscope according to claim 14, wherein the resin is disposed on an inner surface of the through-hole.

17. The endoscope according to claim 1, further comprising a distal end cover configured to cover the screw cover and a part of the distal end rigid body;
wherein the distal end cover covers the screw cover; and
the distal end cover is separately formed from the screw cover.

18. The endoscope according to claim 3, wherein one of the first ring and second ring having an annular recess, and the other of the first ring and the second ring being disposed in the annular recess.

19. The endoscope according to claim 18, wherein the one of the first ring and the second ring having a tapered end that tapers towards the lid.

* * * * *